United States Patent
Huang et al.

(10) Patent No.: US 8,491,826 B2
(45) Date of Patent: Jul. 23, 2013

(54) METHOD OF MANUFACTURING A SUCKER

(75) Inventors: Shih-Ling Huang, Taoyuan Shien (TW); Chin-Chen Li, Taoyuan Shien (TW)

(73) Assignee: Quanta Computer Inc., Taoyuan Shien (TW)

( * ) Notice: Subject to any disclaimer, the term of this patent is extended or adjusted under 35 U.S.C. 154(b) by 251 days.

(21) Appl. No.: 13/064,774

(22) Filed: Apr. 14, 2011

(65) Prior Publication Data
US 2012/0139155 A1 Jun. 7, 2012

(30) Foreign Application Priority Data

Dec. 2, 2010 (TW) .............................. 99141962 A

(51) Int. Cl.
*B29C 45/72* (2006.01)
(52) U.S. Cl.
USPC ...................................... 264/237; 264/328.1

(58) Field of Classification Search
USPC .............................................. 264/237, 328.1
See application file for complete search history.

(56) References Cited

U.S. PATENT DOCUMENTS

| 4,136,144 | A | * | 1/1979 | Munger | 264/161 |
| 5,171,508 | A | * | 12/1992 | Ishizu et al. | 264/236 |
| 8,096,537 | B2 | * | 1/2012 | Browne et al. | 269/21 |
| 2007/0102847 | A1 | * | 5/2007 | Ilda et al. | 264/328.1 |
| 2008/0230661 | A1 | * | 9/2008 | Kawabata | 248/205.5 |

* cited by examiner

*Primary Examiner* — Jill Heitbrink
(74) *Attorney, Agent, or Firm* — Rabin & Berdo, P.C.

(57) ABSTRACT

A method of manufacturing a sucker is provided in this invention. The method includes steps as forming a sucker by an injection molding; heating the sucker; and cooling the sucker down to a room temperature so that an attaching surface of the sucker is substantially flat.

9 Claims, 3 Drawing Sheets

METHOD OF MANUFACTURING A SUCKER

RELATED APPLICATIONS

This application claims priority to Taiwanese Application Serial Number 099141962, filed Dec. 2, 2010, which is herein incorporated by reference.

BACKGROUND

1. Technical Field

The present invention relates to a sucker, more particular to a method of manufacturing a sucker.

2. Description of Related Art

At present, a holder for supporting an electrical device (e.g. GPS device or mobile TV device) includes a base and a sucking element coupling to the base. When the base of the holder supports an electrical device, the sucking element is attached on an attached surface with an attaching surface thereof, thus, the electrical device can be located on an intended position.

However, due to one of variations such as environmental temperature, humidity and material maturing etc. which may deteriorate the air-tightness of the sucking element, the sucking element might depart easily from the attached surface, and the electrical device would be broken as a result of falling down.

One of common solutions for that is to modify the mechanism design of the base in order to enhance the air-tightness of the sucking element. Another is to append solvents to the attaching surface of the sucking element in order to improve the attaching strength of the sucking element. Nevertheless, since the flatness of the attaching surface of the sucking element itself is not easy to perfectly maintain, when the environmental temperature and the humidity of the sucking element are varied to lead the sucking element to be changed or deformed in shape, in which the attaching surface of the sucking element normally is sunken from the center portion thereof, so that the sunken deformation of the attaching surface of the sucking element is therefore getting worse. Thus, when the deformed sucking element is attached on the attached surface, a gap between the attaching surface and the attached surface is getting larger so as to unbalance easily a negative pressure between the attaching surface and the attached surface, and to fail to attach the attaching surface attaching on the attached surface.

SUMMARY

The present invention is to disclose a method of manufacturing a sucker which can steady the structure of the sucker, and postpone the material of the sucker becoming stiff, thus, an expanding gap between the attached surface and the attaching surface of the sucker can be retarded.

In practice of the present invention, the method of manufacturing a sucker comprises steps as follows. First, forming a sucker by an injection molding method, then, heating the sucker within a predetermined time period, next, cooling the sucker down to a room temperature such that an attaching surface of the sucker is substantially flat.

In one embodiment of the present invention, when heating the sucker, the sucker is heated with a heating temperature in a range of 60 to 90 degrees Celsius, especially, at 85 degrees Celsius.

In another embodiment of the present invention, when heating the sucker, the Ambient Humidity is zero.

In the other embodiment of the present invention, after cooling down the sucker to room temperature, the method further comprises a step of covering a film on the attaching surface of the sucker.

In the above embodiments, the material of the sucker can be silicone, thermoplastic rubber (TPR), polyvinyl chloride (PVC), thermoplastic polyurethane (TPU) or the combination thereof.

In the other embodiment of the present invention, when forming the sucker by the injection molding method, the step further comprises a step of forming both a disc and a connection together by a double injection molding method, in which the attaching surface of the disc is flat, and the connection is integrally formed on a center position of a surface of the disc opposite to the attaching surface.

In the embodiment, the material of the disc can be silicone, thermoplastic rubber (TPR), polyvinyl chloride (PVC), thermoplastic polyurethane (TPU) or the combination thereof.

In the embodiment, the material of the connection can be glass fibers, nylon or the combination thereof.

As mentioned above, in the present invention, by heating the injection-molded sucker, chain molecules in the sucker can be rearranged so that the structure of the sucker can be steadier. Therefore, since the method of manufacturing a sucker can delay that the sucker starts to get changed and deformed in shape, thus, the sucker can be postponed to get stiff, such that an expanding gap between the attached surface and the attaching surface of the sucker can be retarded when the deformed sucking element is attached on the attached surface. Consequentially, a negative pressure between the attaching surface and the attached surface being unbalanced can be prevent so as to extend a product life of the sucker.

BRIEF DESCRIPTION OF THE DRAWINGS

The present invention will be apparent to those skilled in the art by reading the following detailed description of a preferred embodiment thereof, with reference to the attached drawings, in which.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Since the material of the sucking element is with a chain molecule structure, thus, when the chain molecule structure of the sucking element is unstable, the sucking element can be easily changed and deformed in shape depending on variations of the environmental conditions. Thus, when the sucking element of the holder mentioned above is attached on the attached surface to bear a base and a device, a gap between the attached surface and the attaching surface of the sucker might be generated sooner or later, and will be deteriorated the air-tightness of the sucking element on the attached surface gradually.

For that, the present invention is to provide a method of manufacturing a sucker. The method processes a heating step to an injection-molded sucker such that the chain molecules of the sucker can be rearranged so that the structure of the sucker can be steadier than prior art. Thus, when an attaching surface of the sucker attaches on an attached surface of an object (e.g. glass), the present invention can intensify the structure of the sucker, postpone the material of the sucker starts to get changed and deformed, thus, an expanding gap between the attached surface and the attaching surface of the sucker can be retarded.

Figure 1:
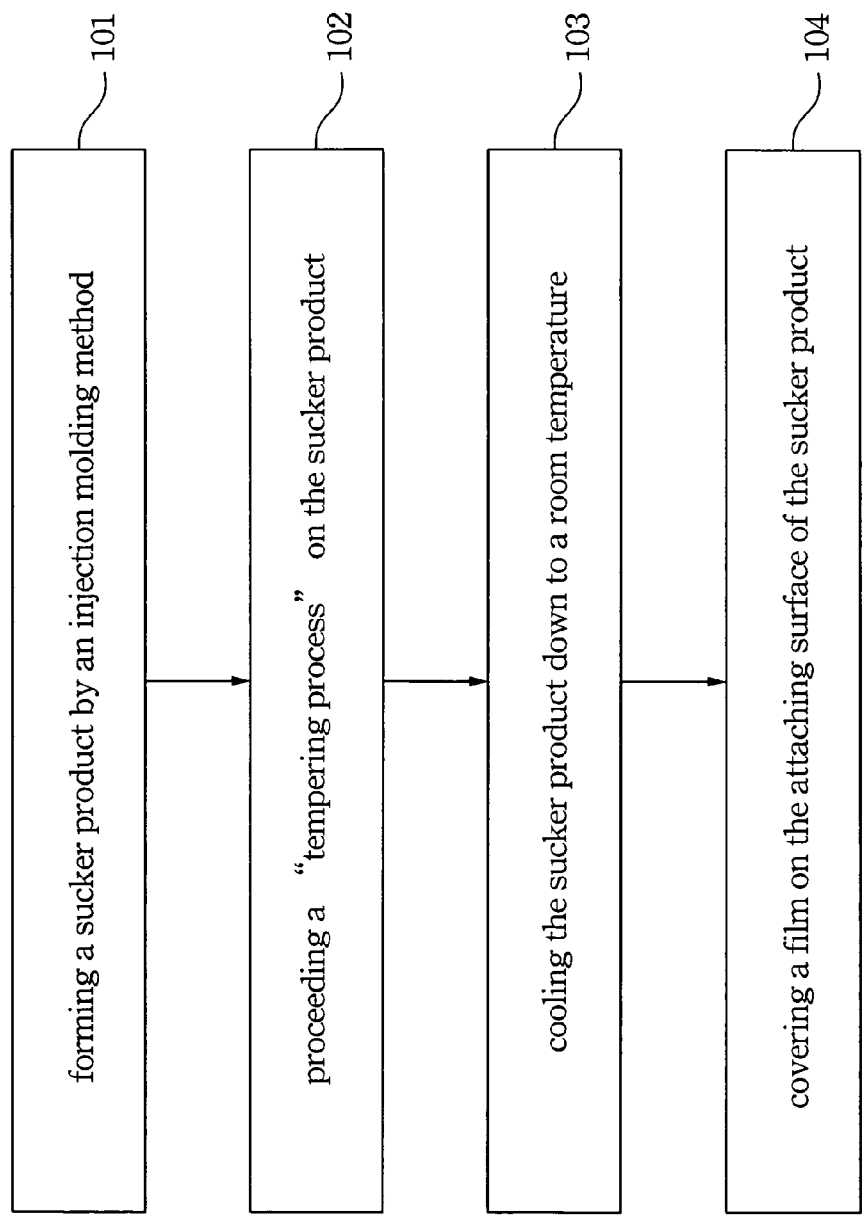
FIG. 1 is a flow chart of a method of manufacturing a sucker according to one embodiment of the present invention.
Figure 2:
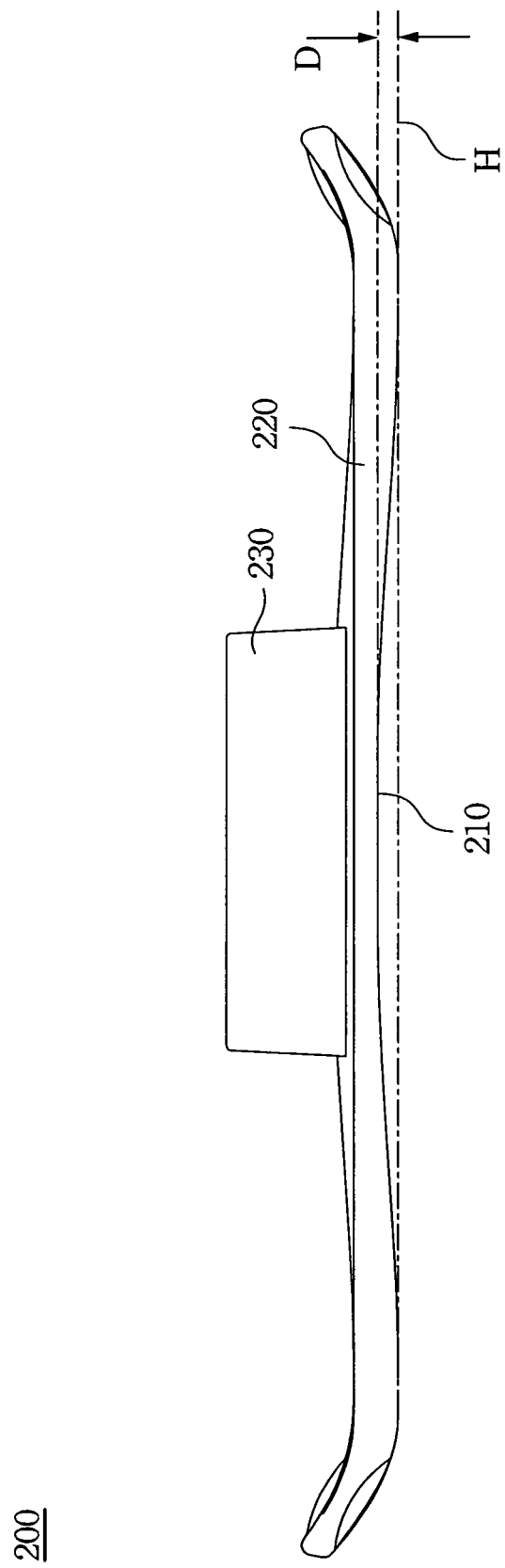
FIG. 2 is a schematic view of a sucker made by the method of the embodiment of the present invention.

Refer to FIG. 1 and FIG. 2. FIG. 1 is a flow chart of a method of manufacturing a sucker according to one embodiment of the present invention. FIG. 2 is a schematic view of a sucker made by the method of the embodiment of the present invention.

In the embodiment, the method of manufacturing a sucker comprises steps as follows.

Step (101): forming a sucker product 200 by an injection molding method.

In the step, for forming the sucker product 200 by the injection molding method, a melted and liquid plastic material is filled into a forming cavity (not shown in figures) of an injection mold, after that, the sucker product 200 is formed by cooling and solidifying the melted and liquid plastic material in the forming cavity. Noted, a melted temperature in the step can reach more than 160 degrees Celsius.

Moreover, the plastic material for forming the sucker product 200, i.e. the material of the sucker product 200, can be silicone, thermoplastic rubber (TPR), polyvinyl chloride (PVC), thermoplastic polyurethane (TPU), or the combination thereof above, or other previously known and used materials for making a conventional sucker. In the embodiment, the sucker product 200 is made of thermoplastic polyurethane (TPU).

Step (102): proceeding a "tempering or curing process" on the sucker product 200 to moderately heat the sucker product 200.

In the step, after the sucker product 200 is moved out the injection mold, the sucker product 200 is heated within a predetermined time period in which heating the sucker product 200 makes the chain molecules of the sucker product 200 to be rearranged such that the structure of the sucker product 200 can be steadier, so as to delay the sucker getting changed and deformed in shape, and keep the geometric dimension and the attaching performance of the sucker product 200 in stability.

In details, after the sucker product 200 is formed and cooled down to a room temperature in step 101, the sucker product 200 is moved into a heating equipment (e.g. baking device with temperature and moisture circulation control). When heating the sucker product 200, the heating temperature of the heating equipment is substantially set in a range of 60 to 90 degrees Celsius, and up to 90 degrees Celsius in maximum. As to ambient humidity, when heating the sucker product 200, the percentage of the ambient humidity set on the heating equipment should be depended on material characteristics of the sucker product 200. For example, when the sucker product 200 is made of thermoplastic polyurethane (TPU), since thermoplastic polyurethane (TPU) is with highly hygroscopic properties, the ambient humidity setting on the heating equipment for the sucker product 200 should be zero (0%) in order to avoid the material characteristics of the sucker product 200 from affecting by water molecules in Step (102).

Preferably, when heating the sucker product 200, the heating temperature of the heating equipment is substantially set at 85 degrees Celsius, and the predetermined time period might be 4 hours at least, and the ambient humidity for the sucker product 200 is zero.

Similarly, if the heating temperature of the heating equipment for the sucker product 200 is lower than 85 degrees Celsius, the predetermined time period should be more than 4 hours; otherwise, if the heating temperature of the heating equipment for the sucker product 200 is between 85 to 90 degrees Celsius, the predetermined time period can be estimated to 4 hours. Also, the heating temperature and the predetermined time period can be further adjusted according to the dimension size of the sucker product 200.

Here, the so-called "tempering or curing process" implies a process to moderately heat the sucker product 200 up to an appropriate temperature, so that the chain molecules of the sucker product 200 can be rearranged, thus, the structure of the sucker product 200 can be steadier so as to delay the sucker product 200 getting changed and deformed in shape, and keep the geometric dimension and the attaching performance of the sucker product 200 in stability.

Step (103): cooling the sucker product 200 down to a room temperature.

In the step, after "tempering or curing process", cooling the sucker product 200 back to the room temperature, the attaching surface 210 of the sucker product 200 is substantially shaped as flat.

Refer to FIG. 2. A gap D between a hypothetical level line aligning to a center portion of the attaching surface 210 and another hypothetical level line H aligning to a rim of the attaching surface 210 is merely 0.8-1.2 mm, therefore, the attaching surface 210 of the sucker product 200 can be seen as substantially flat.

However, the gap D mentioned above only for illustration, different forming conditions and mold ejection styles of the sucker product 200 can lead another results of the gap D between the center portion and the rim of the attaching surface 210.

Step (104): covering a film on the attaching surface 210 of the sucker product 200.

The step is to completely attach a plastic film on the attaching surface 210 of the sucker product 200, so as to ensure the attaching surface 210 of the sucker product 200 not to be contaminated.

By the way, when moving the sucker product 200 to the heating equipment in Step (102), the sucker product 200 can be conveyed by a tray. Since ashes or particles are unavoidably existed on a loading surface of the tray, the attaching surface 210 of the sucker product 200 is preferably not contacted to the loading surface of the tray. Thus, the attaching surface 210 of the sucker product 200 will not form hollows by squashing the ashes or particles corresponding so as to prevent flaws on the attaching surface 210 of the sucker product 200.

Figure 3:
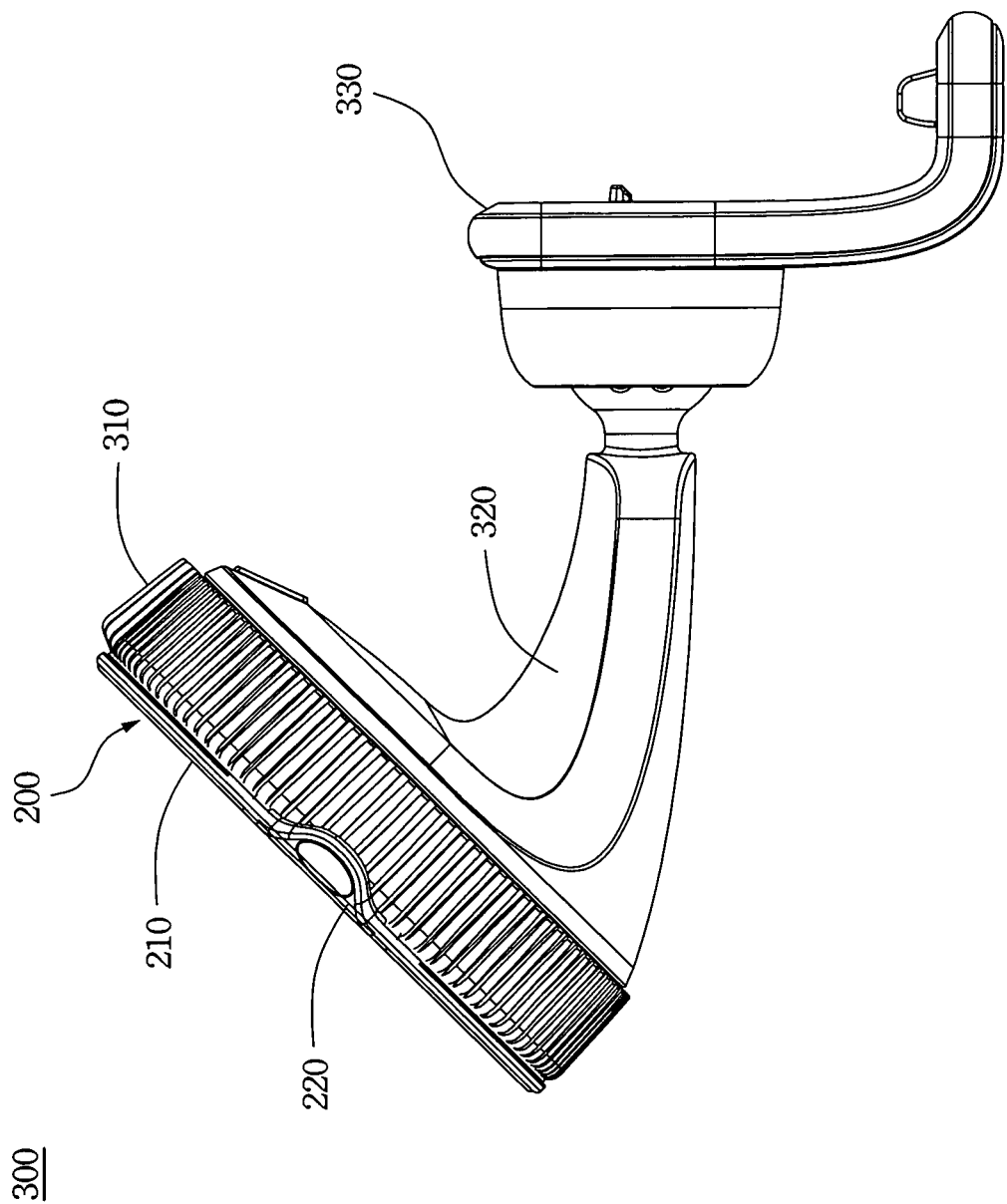
FIG. 3 is a schematic view of the sucker in FIG. 2 implemented to a holder.

Refer to FIG. 3. FIG. 3 is a schematic view of the sucker in FIG. 2 implemented to a holder. In another embodiment of the invention, the sucker product 200 made by the present invention can be implemented on a holder 300 of an electrical device. The holder 300 includes a base 310, a main body 320 and a holding portion 330. The main body 320 connects the base 310 and the holding portion 330. The holding portion 330 can hold an electrical device (e.g. mobile phone, GPS device or mobile TV device). The sucker product 200 can be implemented on the base 310, thus, when the base 310 is operated to attach the attaching surface 210 of the sucker product 200 on an attached surface of an object (e.g. glass), a vacuum state is generated between the attaching surface 210 of the sucker product 200 and the attached surface. Therefore, the holder 300 can hold the electrical device so as to fix the electrical device on an intended position.

More particularly, Step (101) "forming the sucker product 200 by the injection molding method" further comprises forming both a disc 220 and a connection 230 (FIG. 2) together by the injection molding method. In this embodiment, both the disc 220 and the connection 230 also can be formed by a double injection molding method in which the attaching surface 210 of the disc 220 is flat, and the connection 230 is integrally formed on a center position of a surface of the disc 220 opposite to the attaching surface 210. After that, the disc 220 with the connection 230 is then proceeded to Step (102) so that the sucker product 200 could be connected the mentioned base 310 with the connection 230.

In the embodiment, the material of the disc 220 can be silicone, thermoplastic rubber (TPR), polyvinyl chloride (PVC), thermoplastic polyurethane (TPU) or the combination thereof. The material of the connection can be glass fibers, nylon or the combination thereof.

While testing the sucker products 200 in which six holders 300 each having a first sucker and six holders 300 each having a second sucker are provided, the holders 300 with the first sucker and with the second sucker all load an object with same weight, respectively, and are all attached on the same attached surface (glass). Here, the first suckers never go through Step (102), but the second suckers have gone through Step (102).

Next, the inventor leaves the twelve holders 300 in a high temperature (e.g. 55 degrees Celsius) environment for three days, a low temperature (e.g. −10 degrees Celsius) environment for three days, and an environment with circulated temperature and humidity variations (e.g. 25 degrees Celsius and 85% humidity) for five days, sequentially. Then, the inventor respectively notes each gap D of each first suckers and second suckers as shown in Graph 1 below.

| Graph 1 | | |
|---|---|---|
| | First sucker | Second sucker |
| 1 | 2.80* | 1.90 |
| 2 | 2.90* | 1.80 |
| 3 | 2.70 | 2.30 |
| 4 | 2.68 | 2.50 |
| 5 | 2.90 | 2.30 |
| 6 | 2.70 | 1.86 |

*Already falling down from the attached surface before the test finished

As shown in Graph 1 above, the gap D of each second sucker is further smaller than the gap D of each first sucker, that is, the sucker product 200 ever gone through "tempering or curing process" in Step (102) can delay that the sucker product 200 starts to get changed and deformed in shape, thus, the sucker can be postponed getting stiff, such that an expanding gap between the attached surface and the attaching surface of the sucker can be retarded.

Although the present invention has been described with reference to the preferred embodiments thereof, it is apparent to those skilled in the art that a variety of modifications and changes may be made without departing from the scope of the present invention which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method of manufacturing a sucker, the method comprising:
    forming the sucker by an injection molding method;
    providing a baking device with temperature and moisture circulation control;
    heating the baking device to a temperature ranging from 60 to 90 degrees Celsius;
    moving the sucker from an injection mold into the baking device;
    heating the sucker in the baking device, that is heated to the temperature ranging from 60 to 90 degrees Celsius, for about 4 hours so as to purely temper the sucker in the baking device for rearranging chain molecules of the sucker; and
    cooling the sucker down to a room temperature such that an attaching surface of the sucker is substantially flat, wherein a gap between a hypothetical level line aligning to a center portion of the attaching surface and another hypothetical level line aligning to a rim of the attaching surface is 0.8-1.2 mm.

2. The method of manufacturing a sucker according to claim 1, wherein in the heating the sucker, the temperature of the baking device is at 85 degrees Celsius.

3. The method of manufacturing a sucker according to claim 1, wherein in the heating the sucker, an ambient humidity is zero %.

4. The method of manufacturing a sucker according to claim 1 further comprising:
    covering a film on the attaching surface of the sucker.

5. The method of manufacturing a sucker according to claim 1, wherein a material of the sucker is selected from the group consisting of silicone, thermoplastic rubber (TPR), polyvinyl chloride (PVC), thermoplastic polyurethane (TPU) and a combination thereof.

6. The method of manufacturing a sucker according to claim 1, wherein the step of forming the sucker by the injection molding method, comprises:
    forming both a disc and a connection together by a double injection molding method,
    wherein the disc includes the attaching surface, the attaching surface is flat, and the connection is integrally formed on a center position of a surface of the disc opposite to the attaching surface.

7. The method of manufacturing a sucker according to claim 6, wherein a material of the disc is selected from the group consisting of silicone, thermoplastic rubber (TPR), polyvinyl chloride (PVC), thermoplastic polyurethane (TPU) and a combination thereof.

8. The method of manufacturing a sucker according to claim 6, wherein a material of the connection is selected from the group consisting of glass fiber, nylon and a combination thereof.

9. The method of manufacturing a sucker according to claim 1, wherein the hypothetical level lines are parallel to each other, and further wherein each of the hypothetical level lines is parallel to each of the center portion and the rim.

* * * * *